United States Patent
Kotlarski

(10) Patent No.: US 6,499,181 B1
(45) Date of Patent: Dec. 31, 2002

(54) CONNECTION DEVICE BETWEEN A WIPER BLADE AND ARM

(75) Inventor: Thomas Kotlarski, Bad Neuenahr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,748

(22) PCT Filed: Jul. 31, 1999

(86) PCT No.: PCT/DE99/02367

§ 371 (c)(1), (2), (4) Date: Oct. 2, 2000

(87) PCT Pub. No.: WO00/38962

PCT Pub. Date: Jul. 6, 2000

(30) Foreign Application Priority Data

Dec. 7, 1998 (DE) .......................................... 198 56 299

(51) Int. Cl.$^7$ .................................................. B60S 1/40
(52) U.S. Cl. ............................. 15/250.201; 15/250.32; 15/250.43; 15/250.48
(58) Field of Search ......................... 15/250.43, 250.44, 15/250.201, 250.32, 250.451, 250.48, 250.33

(56) References Cited

U.S. PATENT DOCUMENTS

| | | | |
|---|---|---|---|
| 2,794,203 A | 6/1957 | Oishei | 15/250.201 |
| 3,192,551 A | * 7/1965 | Appel | 15/250.43 |
| 3,296,647 A | 1/1967 | Gumbleton | 15/250.201 |
| 3,317,945 A | 5/1967 | Ludwig | 15/250.48 |
| 3,881,214 A | 5/1975 | Palu | 15/250.43 |

FOREIGN PATENT DOCUMENTS

| | | |
|---|---|---|
| DE | 197 29 865 A1 | 1/1999 |
| DE | 197 39 256 A | 3/1999 |

* cited by examiner

*Primary Examiner*—Gary K. Graham
(74) *Attorney, Agent, or Firm*—Michael J. Striker

(57) ABSTRACT

A connection device is proposed, which serves the purpose of pivotably connecting a wiper blade, for windows of motor vehicles, to a wiper arm. The connection device has a coupling element on the wiper blade which is pivotably connectable to a coupling part on the wiper arm. The coupling element is disposed on an upper band face, in a center portion, of a band-shaped, elongated spring-elastic support element of the wiper blade. The wiper blade is provided with a spoiler, on the side of the upper band face, extending on both sides of the coupling element and defining a leading-edge face. Additionally, the coupling part is also provided with a leading-edge face extending longitudinally with the spoiler thereon to improve wiper blade function.

10 Claims, 4 Drawing Sheets

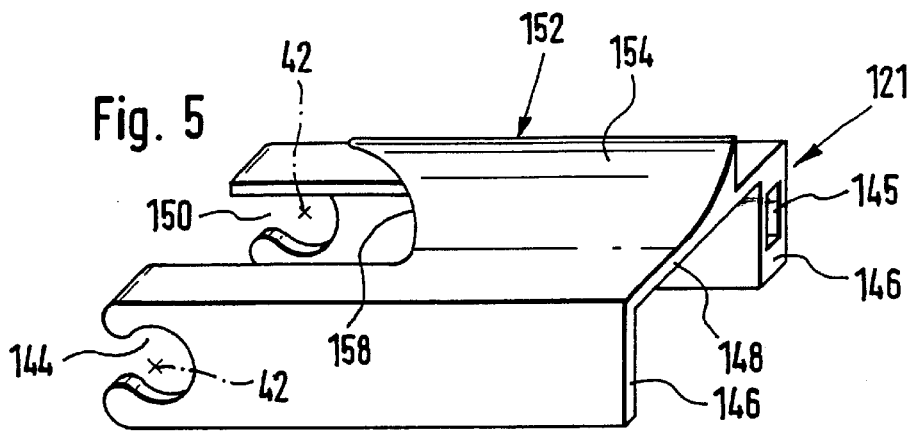
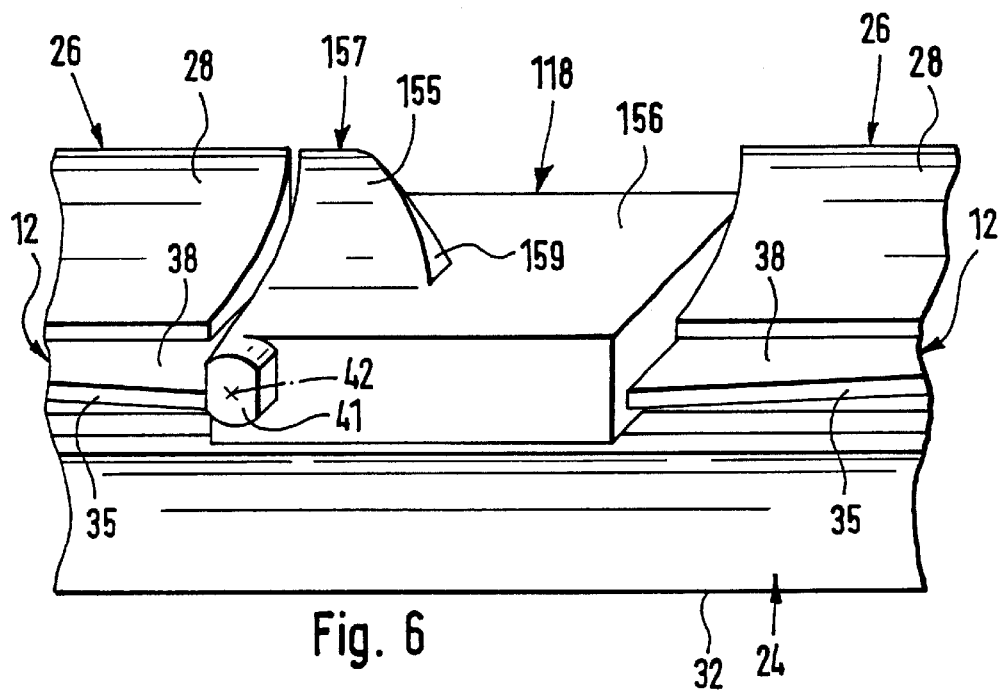
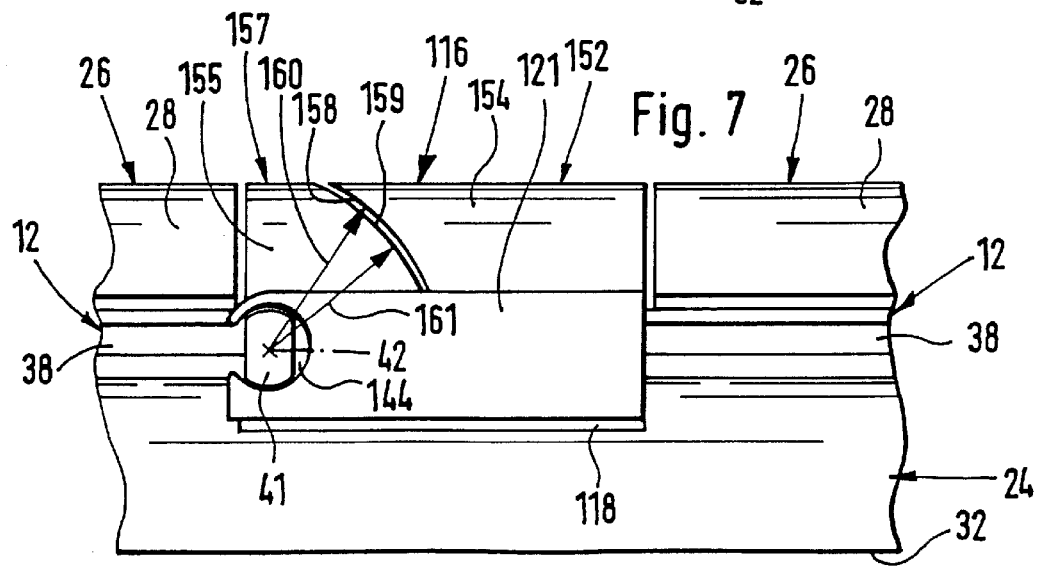

CONNECTION DEVICE BETWEEN A WIPER BLADE AND ARM

BACKGROUND OF THE INVENTION

A known connection device of the type is seated with its coupling element toward the wiper blade on the upper band face of the support element, which forms the termination of the wiper blade remote from the window (German Patent Disclosure DE 1972 98 65.6 A1).

However, if to avoid the tendencies of the wiper blade to lift away from the window at relatively high travel speeds, the wiper blade is to be provided with a spoiler, then the spoiler must be recessed accordingly in the mounting region provided for the connection device and located in the longitudinal center portion, so that the coupling element toward the blade can be fastened properly. In the case of a wiper strip made by die-pressing or molding, this must be accomplished with the aid of a complicated die-forming mold, while in the case of an extruded wiper strip, one additional work step is needed for this. Interrupting the course of the spoiler furthermore has a disruptive effect on the distribution of the contact force of the wiping action on the window. Furthermore, making an interruption in the leading- edge face that faces into the relative wind and is present on the spoiler undesirably increases the relative wind noise.

SUMMARY OF THE INVENTION

In the connection device of the invention, the leading-edge face is extended past the connection device, so that at most only a small gap remains, which in terms of the distribution of contact force and noise production can be ignored.

The leading-edge face of the coupling part can be embodied in a simple on a striplike protrusion disposed on the coupling part and aligned at least nearly with the spoiler.

If the striplike protrusion, originating at the end of the coupling part remote from the pivot axis of the connection device, extends toward the pivot axis, then a continuous transition from the leading-edge face of the spoiler to the leading-edge face of the connection device is assured, and in the region of the pivot axis, a small spacing, which is required for connecting the wiper blade to the wiper arm, can remain.

An especially advantageous embodiment in terms of ease of assembly of the coupling part toward the wiper arm is obtained if, in a refinement of the invention, the coupling part a U-shaped cross section; the bearing recesses are disposed on a longitudinal end portion in the legs of the U that cover the side cheeks of the coupling element; the striplike protrusion is disposed on the side of the base of the U remote from the legs of the U; and the striplike protrusion is provided with a leading-edge face and ends in spaced-apart fashion from the common pivot axis of the bearing recesses.

An extension of the concept of the invention is distinguished in that the base of the U, in the region of the pivot axis, is provided with a recess extending as far as the protrusion, and that the coupling element, on its side toward the base of the U of the coupling part, has a protrusion which penetrates the recess and on which a supplementary leading-edge face aligned with the leading-edge face of the protrusion is embodied. It is thus possible to extend the leading-edge face without interruption over its entire length without impairment of the work steps required for attaching the wiper blade to the wiper arm. As a result, especially good values in terms of the contact force distribution and noise development are attained.

The ease of assembly of a connection device of this kind is improved still further if the adjacent ends of the protrusion and of the protrusion each have a curved course, following a respective radius, and the centers of the radii of curvature are located on the pivot axis.

Economical manufacture of the connection device is attained if both the protrusions are integrally joined to the coupling part and the coupling element, respectively.

If in another embodiment of the invention, the striplike protrusion of the coupling part is longitudinally displaceable and lockable between an assembly position and an operating position, and in the operating position, the end of the protrusion toward the pivot axis is adjacent to the spoiler of the wiper blade, then the spacing between the spoiler and the protrusion which is required for assembly can be reduced afterward or eliminated entirely.

The protrusion can be integrated extensively into the course of the spoiler, if the striplike protrusion, on its end remote from the pivot axis and on its back side remote from its leading-edge face, has a free punch which measured longitudinally is approximately as long as the maximum longitudinal displacement path of the protrusion.

Expediently, both the coupling part and the coupling element are made from a plastic.

Further advantageous refinements and features of the invention are disclosed in the ensuing description of exemplary embodiments shown in the accompanying drawing.

BRIEF DESCRIPTION OF THE DRAWINGS

In the drawing:

FIG. 5 is a perspective view of a different version of the coupling part;

FIG. 6 shows the coupling element, disposed in the middle portion of a wiper blade and belonging to the coupling part of FIG. 5;

FIG. 7 is a side view of the connection device, assembled from the components of FIGS. 5 and 6;

DESCRIPTION OF THE PREFERRED EMBODIMENTS

Figure 1:
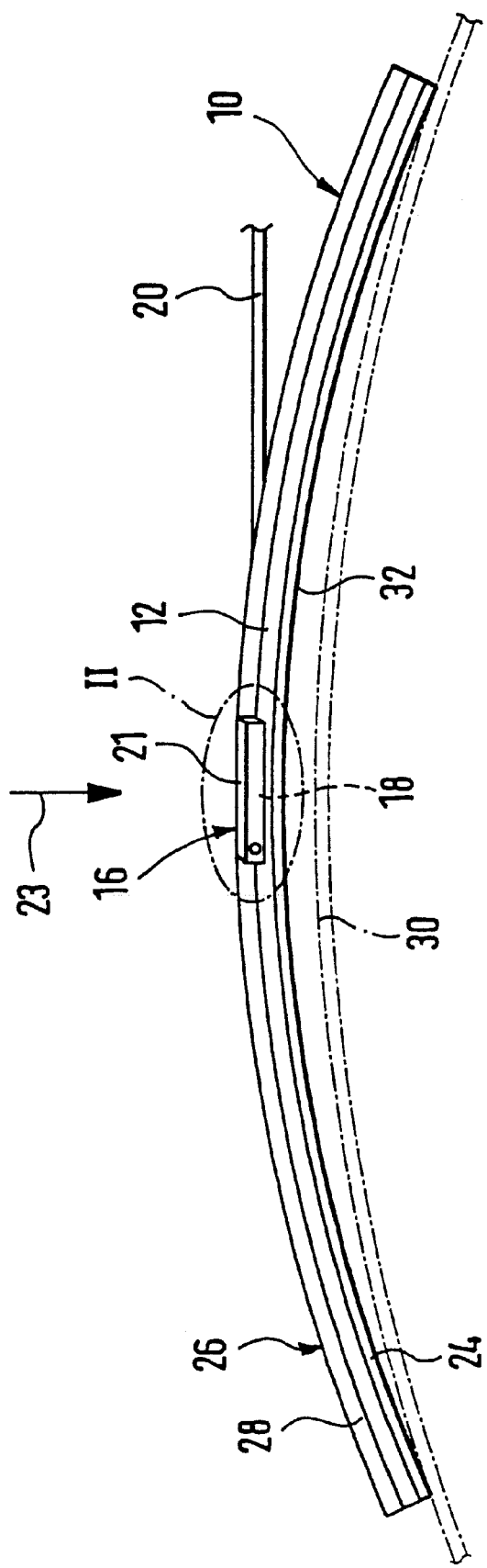
FIG. 1 is a side view of a wiper blade which is connected by a connection device to a wiper arm.

A wiper blade 10 shown in FIG. 1 has a bandlike-elongated, spring-elastic support element 12. On the top side 14 of the band of the support element 12, remote from the window to be wiped, there is a coupling element 18, made from a plastic, which belongs to a connection device 16 and with the aid of which the wiper blade 10 can be separably connected to a wiper arm 20 that is guided on the body of a motor vehicle and is movable between turning points. For the sake of this separable connection, the wiper arm, on its free end, is provided with a coupling part 21, made of plastic, which also belongs to the connection device 16. On the underside 22 of the band of the support element 12, oriented toward the window, there is an elongated, rubber-elastic wiper strip 24 parallel to the longitudinal axis of the support element. The wiper strip 24 extends with a striplike extension 26 past the top side 14 of the support element 12; this extension, on the top side of the support element, forms a spoiler that is provided with a leading-edge face or leading-edge throat 28. The coupling part 21 and the coupling element 18 together form the connection device 16, whose structure will be described in further detail herein. The wiper arm 20 and thus the wiper blade 10 as well are urged in the direction of the arrow 23 toward the window to be wiped, whose surface to be wiped is represented in FIG. 1 by a dot-dashed line 30. Since the dot-dashed line 30 is meant to represent the greatest curvature of the window surface, it is clearly apparent that the curvature of the wiper blade 10, resting with both ends on the window, is greater than the maximum window curvature. Under the contact pressure (arrow 23), the wiper blade 10 presses with its wiper lip 32, over its full length, against the window surface 28. In the process, a tension builds up in the spring-elastic support element 12, and this tension assures a proper contact of the wiper strip 24 or wiper lip 32, over its entire length, with the vehicle window.

Figure 2:
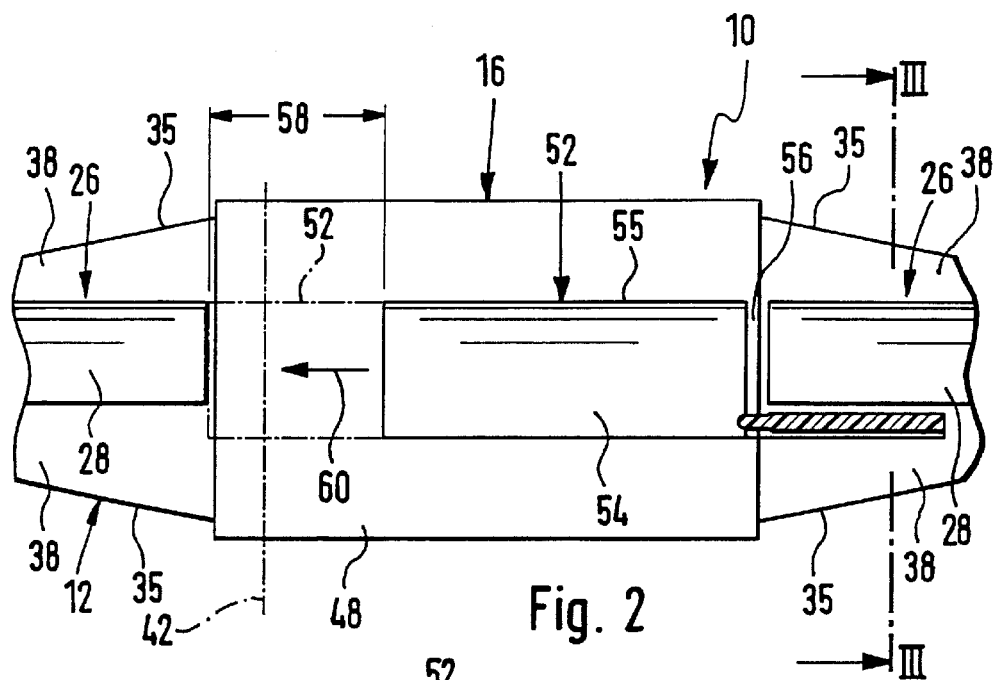
FIG. 2, showing the connection device in plan view, is an enlargement of the detail marked II in FIG. 1.
Figure 3:
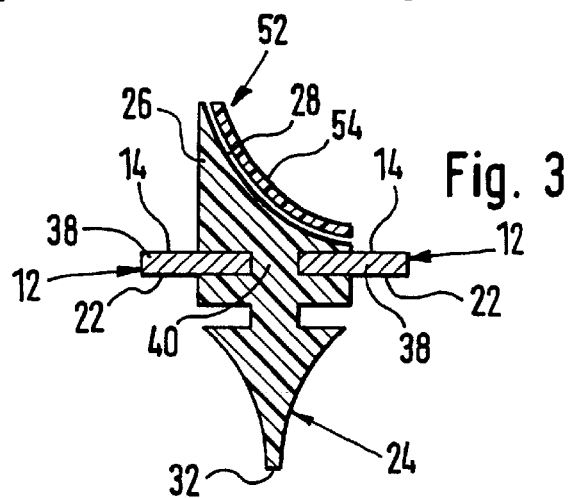
FIG. 3 is a section taken along the line III—III through the connection device of FIG. 2, rotated by 90°.
Figure 4:
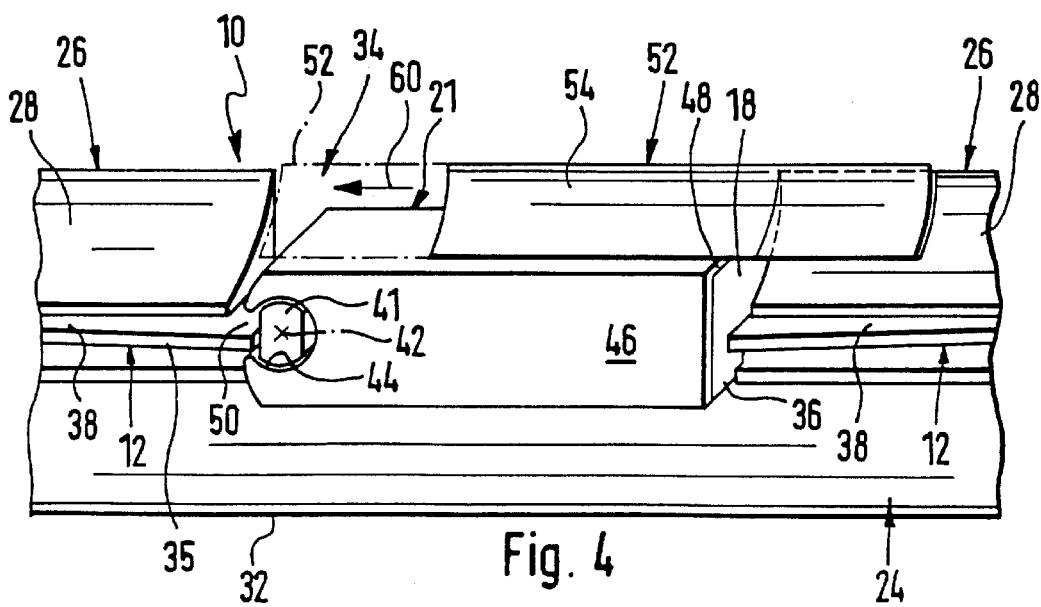
FIG. 4 is a perspective side view of the arrangement of FIG. 2.

The special embodiment of the connection device 16 will now be described in further detail. A first embodiment of the connection device 16 of the invention—shown in FIGS. 2–4—is the same in its basic structure as the further embodiments of FIGS. 5–7 and FIGS. 8 and 9. As FIG. 4 in particular shows, the coupling element 18 toward the wiper blade is seated in a longitudinal recess 34 of the spoiler 26, and this spoiler, because of the longitudinal recess 34 disposed in the longitudinal center portion of the wiper blade 10, now has two segments. The coupling element 18, preferably made of plastic, is seated on the top side 14 of the support element 12 and clasps its longitudinal edges 35 as far as the underside 22 of the support element (FIG. 4). As FIG. 3 shows, the support element 12 has two longitudinal rails 38, spaced apart from one another. With a rib strip 40, the wiper strip 24 intersects the plane of the support element 12 and forms an extension 26, on the top side 14 of the support element, that has a leading-edge throat 28 (FIG. 3), which assures an improved contact pressure of the wiper lip 32 against the window surface 30 to be wiped. The coupling element 18 has one pivot pin 41 on each of its two opposed long sides, and each pivot pin protrudes from the respective long side of the wiper blade 10. The two pivot pins 41 have a common longitudinal axis 42, which extends transversely to the longitudinal direction of the wiper blade, in a plane spaced apart from the window (FIGS. 1 and 4). The pivot pins 41 form pivot means toward the wiper blade, which are each guided in a respective bearing recess 44 of the coupling part 21 toward the wiper arm. The longitudinal axes 42 of the pivot pins 41 and bearing recesses 44 form a pivot axis, about which a relative motion is possible between the coupling element 18 and the coupling part 21, or between the wiper blade 10 and the wiper arm 20. This is applicable to all the embodiments of the invention described here. The coupling part 21 has a substantially U-shaped cross section. The bearing recesses 44 for the pivot pins 41 are disposed in the legs 46 of its U. The bearing recesses 44 are open at the edge, via an introduction opening 50 for the pivot pins 41, which are nonround in cross section.

In FIG. 4, only one of the two pivot pins 41 and one of the two bearing recesses 44 is shown. Since the other side of the connection device 16 is embodied the same way as the one long side that is visible, it needs no further description, especially since the dot-dashed line 42 in FIG. 2 indicates the common longitudinal axis of both pivot pins 41 and both bearing recesses 44.

In order to close the longitudinal recess 34 for wiping operation, the coupling part 21, on the side of the base 48 of the U remote from the coupling element 18, has a striplike protrusion 52, which extends longitudinally of the wiper blade 10 and hence also longitudinally of the spoiler 26. The protrusion 52 is provided with a leading-edge throat 54, which extends over the full length of the protrusion 52. In this exemplary embodiment, the leading-edge throat 54 of the protrusion 52 is located slightly in front of the leading-edge throat 28 of the spoiler 26. As a result, it is possible to provide the protrusion 52, on its back side 55 remote from its leading-edge throat 54 and on its end remote from the pivot axis 42, with a recess 56 that is so large that the protrusion is displaceable longitudinally by an amount 58 (FIG. 2). In FIGS. 2 and 4, the protrusion is shown in a position which enables problem-free mounting of the wiper blade 10 on the wiper arm 20. Its operating position is shown in dot-dashed lines there. The assembly process will be described later herein, in conjunction with FIGS. 8 and 9. Once the connection device 16 has been put together (FIG. 4), when the legs 46 of the U of the coupling part 21 cover the side cheeks of the coupling element 18, the protrusion 52 can be displaced by the amount 58 in the direction of the arrow 60, so that in the operating position now reached, the end of the protrusion toward the pivot axis 42 is directly adjacent to the spoiler 26 of the wiper blade 10.

If the recess 56 is disposed on the end of the protrusion 52 toward the pivot axis 42, then it can be solidly joined to the coupling part 21, without hindering the mounting of the wiper blade 10 on the wiper arm 20.

Another embodiment 116 of the connection device will be described below in conjunction with FIGS. 5–7. FIG. 5 especially clearly shows the structure of the coupling part 121 toward the wiper arm, with its essentially U-shaped cross section. This basic structure is also present in the embodiment of FIGS. 2–4. FIG. 5 also shows the disposition of the bearing recesses 144 in the legs 146 of the U of the coupling part 121. It can also be seen from FIG. 5 that one leg 146, the rear leg of the U, is equipped with a receiving opening 145 for the wiper arm 20. In this embodiment, a striplike protrusion 152 is also present on the outside of the base 148 of the U, integrally joined to it; the protrusion extends longitudinally of the wiper blade and is provided with a leading-edge throat 154. The protrusion 152, with its leading-edge throat 154, forms one segment a supplementary spoiler that is joined solidly, preferably integrally, to the U-shaped base body of the coupling part 121 and that extends from the end, remote from the pivot axis 42, of the coupling part 121 as far as a recess 150, which is disposed in the base 148 of the U and extends from the striplike protrusion 152 as far as the end, toward the pivot axis, of the base 148, where it is open at the edge. The protrusion 152 ends in spaced-apart fashion in front of the pivot axis 42. FIG. 6 shows that a protrusion 157 is present on the surface 156, toward the base 148 of the U, of the coupling element 118 toward the wiper blade. This protrusion forms an extension of the striplike protrusion 152 and is solidly, preferably integrally, joined to the coupling element 118 made from a plastic. This supplementary protrusion 157 extends from the end toward the pivot axis of the coupling element 118 and is adapted to the length of the recess 150, whose length extends as far as the striplike protrusion 152. The extension 157 of the striplike protrusion 152 essentially has a cross section that is identical to that of the protrusion 152, and thus it likewise has a leading-edge throat 155. The striplike protrusion 152 and its extension 157 toward the coupling element is aligned with the spoiler 26 of the wiper blade 10, in the assembled state of the connection device 116. It can also be seen from FIG. 7 that the adjacent ends 158 and 159 of the protrusion 152 and of its extension 157 each extend in curved fashion, following a radius, and that the centers of the radii of curvature 160 and 161, respectively, are located on the pivot axis 42. In this arrangement, unproblematic relative swiveling between the wiper arm 20 and the wiper blade 10 or between the coupling part 121 and the coupling element 118 is possible without creating any substantial gap in the region of the protrusion 152 and its extension 157. The basic design of the coupling element 118 and its fastening to the support element 12 are as in the disposition and embodiment described for the exemplary embodiment of FIGS. 2–4.

Figure 8:
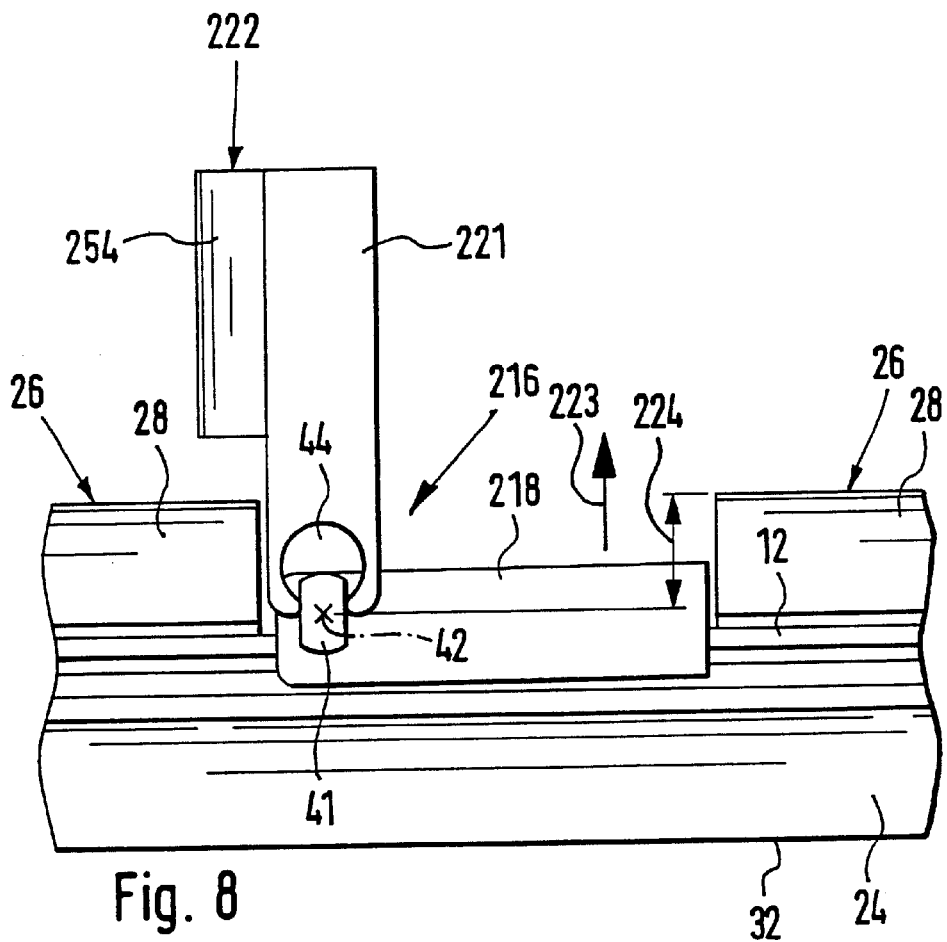
FIG. 8 is a side view of a further connection device, in which the coupling part of the wiper arm is shown in the assembly position.
Figure 9:
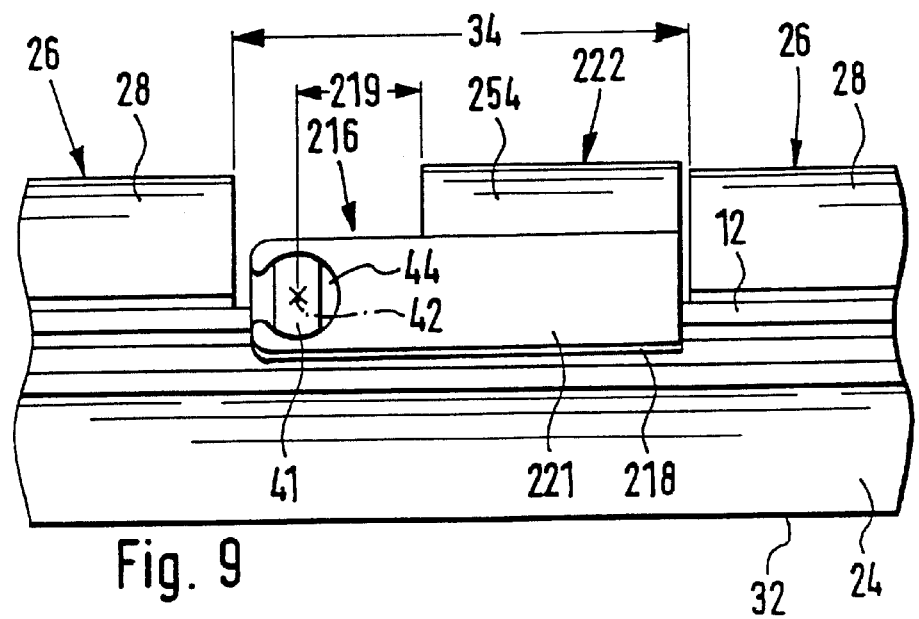
FIG. 9 shows the arrangement of FIG. 8, with the coupling part shown in the operating position.

A further, especially simple embodiment 216 of the connection device of the invention is shown in FIGS. 8 and 9. In this embodiment, the coupling element 218 toward the wiper blade corresponds to the coupling element 18 of FIG. 4. The coupling part 221 toward the wiper arm has a protrusion 222, integrally joined to it, which extends from the end remote from the pivot axis of the coupling part 221 in the direction of the pivot axis 42. However, it ends with a spacing 219 in front of the pivot axis 42 (FIG. 9). This spacing 219 is required so that the wiper blade 10 can be joined to the wiper arm 20, because for that purpose the wiper blade must be put in a position crosswise to the length of the wiper arm (FIG. 8). That is, the wiper blade must be joined to the wiper arm in this assembly position shown; with its pivot pins 41, it enters the bearing recesses 44 of the coupling part 221 toward the wiper arm in the direction of the arrow 223, after which it is then rotated into its operating position shown in FIG. 9. As FIG. 8 shows, because of the projection 224 of the spoiler 26 past the pivot axis 42, it is necessary that the spacing or free space 219 be maintained. Naturally, it continues to exist in the operating position as well, but a considerable portion of the longitudinal recess 34 is already closed then by the protrusion 222. In this embodiment as well, there is a leading-edge throat 254 on the protrusion 222; this leading-edge throat directly adjoins the leading-edge throat 28 of the spoiler 26.

It is common to all the exemplary embodiments that the wiper blade, on the side of the upper band face 14 of the support element 12, is provided with a spoiler 26 that has a leading-edge face 28 and that extends on both sides of the coupling element 18, 118, or 218 in the longitudinal direction of the wiper blade, and that a leading-edge face 54, or 154, 156, or 254 extending longitudinally of the spoiler 26 is embodied at least on the coupling part 21 or 121 or 221, toward the wiper arm, of the connection device 16, 116, or 216, respectively. The leading-edge faces are expediently shaped as throats.

What is claimed is:

1. A device (16) connecting components of a wiper system for windows of motor vehicles including a wiper blade (10), a wiper arm (20), a wiperstip (24), and a band-shape delongated spring elastic support element (12), the device comprising a coupling part (21) arranged on an arm side, a coupling element (18) at a wiper blade side and pivotably connected to the coupling part (21), which coupling element is disposed in a center portion of the band-shaped-elongated, spring-elastic support element (12), on an upper band face (14) thereof remote from the window, and the wiper strip (24) oriented parallel to a longitudinal axis of the support element is located on a lower band face (22) of the support element, oriented toward the window, and can be pressed against the window, wherein from each long side of the wiper blade (10), one pivot pin (41) disposed on the coupling element (18) protrudes, and a common longitudinal pivot axis (42) of these pivot pins extends transversely to the longitudinal direction of the wiper blade in a plane spaced apart from the window, and each of the pivot pins (41), forming pivot means toward the blade, engages a bearing recess (44), associated to these pivot pins and forming the pivot means toward the blade, engages a bearing recess (44), associated to these pivot pins and forming the pivot means on the wiper arm side, of the coupling part (21), characterized in that the wiper blade (10), on the side of the upper band face (14) of the support element (12), is provided with a spoiler (26), extending on both sides of the coupling element (18) in the longitudinal direction of the wiper blade and having a leading-edge face (28), and that a leading-edge face (54, 154, or 254) extending longitudinally of the spoiler (26) is embodied at least on the coupling part (21), toward the wiper arm of the connection device (16).

2. The device of claim 1, characterized in that the leading-edge face (54, 154, or 254) of the coupling part (21, 121, or 221, respectively) is embodied on a strip-shaped main protrusion (52, 152, or 222, respectively), disposed on the coupling part, which protrusion is at least nearly aligned with the spoiler (26).

3. The device of claim 2, characterized in that the strip-shape main protrusion (52, 152, or 222) extends, originating at an end of the coupling part (21) remote from the pivot axis (42) of the connection device (16), to the pivot axis (42).

4. The device of claim 3, characterized in that the coupling part (121) has a U-shaped transverse cross section; that the bearing recesses (144) are disposed on a longitudinal end portion in legs (146) of the U that cover side cheeks of the coupling element (118); that the strip-shaped main protrusion (152) is disposed on a side of a base (148) of the U remote from the legs (146) of the U; and that the strip-shaped main protrusion (152) is provided with a leading-edge face (154) and ends in spaced-apart fashion from the common pivot axis (42) of the bearing recesses (144).

5. The device of claim 4, characterized in that the base (148) of the U, in the region of the pivot axis (42), is provided with a recess (150) extending as far as the main protrusion (152), and that the coupling element (118), on its side toward the base (148) of the U of the coupling part (121), has a supplementary protrusion (157) which penetrates the recess (150) and on which a supplementary leading-edge face (160) aligned with the leading-edge face (154) of the main protrusion (152) is embodied.

6. The device of claim 5, characterized in that adjacent ends (158, 159) of the main protrusion (152) and of the supplementary protrusion (157) each have a curved course, following a respective radius (160; 161), and that the centers of the radii of curvature are located on the pivot axis (42).

7. The device of claim 5, characterized in that the protrusions (152 and 157) are integrally joined to the coupling part (121) and the coupling element (118), respectively.

8. The device of claim 2, characterized in that the strip-shaped main protrusion (52) of the coupling part (21) is longitudinally displaceable between an assembly position and an operating position, and in the operating position, the end of the protrusion (52) toward the pivot axis (42) is adjacent to the spoiler (26) of the wiper blade (10).

9. The device of claim 8, characterized in that the striplike protrusion (52), on its end remote from the pivot axis (42) and on its back side (55) remote from its leading-edge face (54), has a recess (56) which measured longitudinally is approximately as long as a maximum longitudinal displacement path (58) of the strip-shaped main protrusion (52).

10. The device of claim 1, characterized in that both the coupling part (21, 121 and 221) and the coupling element (18, 118, and 218, respectively) are made from a plastic.

* * * * *